(12) United States Patent
Umemoto et al.

(10) Patent No.: US 7,181,688 B1
(45) Date of Patent: Feb. 20, 2007

(54) DEVICE AND METHOD FOR RETRIEVING DOCUMENTS

(75) Inventors: Hiroshi Umemoto, Nakai-machi (JP); Masakazu Tateno, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 801 days.

(21) Appl. No.: 09/645,882

(22) Filed: Aug. 25, 2000

(30) Foreign Application Priority Data

Sep. 10, 1999 (JP) .................................. 11-257665

(51) Int. Cl.
*G06N 3/00* (2006.01)
(52) U.S. Cl. ....................................................... 715/531
(58) Field of Classification Search ................ 715/514, 715/513, 512, 530, 500, 517, 523, 531; 345/835; 707/5, 3

See application file for complete search history.

(56) References Cited

U.S. PATENT DOCUMENTS

| 5,704,060 | A | * | 12/1997 | Del Monte | ............... | 707/104.1 |
| 5,781,904 | A | * | 7/1998 | Oren et al. | ................... | 707/100 |
| 5,983,237 | A | * | 11/1999 | Jain et al. | ................. | 707/104.1 |
| 6,006,225 | A | * | 12/1999 | Bowman et al. | ................ | 707/5 |
| 6,029,167 | A | * | 2/2000 | Evans | ............................ | 707/4 |
| 6,088,709 | A | * | 7/2000 | Watanabe | .................... | 715/512 |
| 6,182,065 | B1 | * | 1/2001 | Yeomans | ....................... | 707/3 |
| 6,516,312 | B1 | * | 2/2003 | Kraft et al. | ..................... | 707/3 |

FOREIGN PATENT DOCUMENTS

| JP | A-7-182373 | 7/1995 |
| JP | A-10-134075 | 5/1998 |

(Continued)

OTHER PUBLICATIONS

"Google's New GoogleScout Feature Expands Scope of Search on the Internet," Sep. 21, 1999, available at <http://web.archive.org/web/19991128214815/www.google.com/pressrel/pressrelease4.html>, pp. 1-4.*

(Continued)

*Primary Examiner*—Stephen Hong
*Assistant Examiner*—Kyle Stork
(74) *Attorney, Agent, or Firm*—Oliff & Berridge, PLC

(57) ABSTRACT

The retrieval condition acquisition unit receives a logical operation expression of the keywords as a retrieval condition from a user. The matching document retrieval unit acquires a list of the document IDs corresponding to the keywords inputted, from the word index of the document information storage unit, and applies a specified logical operation to the result to acquire the matching document IDs. The related keyword calculation unit acquires the keywords extracted from the matching documents retrieved by the matching document retrieval unit as the related keywords, and calculates the degrees of relatedness of each of the matching documents. The related part extraction unit accumulates the degrees of relatedness of the related keywords as to each of the matching documents, and extracts the sentences with the appearance orders in the text kept, in the order of the sentence having a higher accumulated value, until the total length of the sentences extracted becomes longer than a predetermined length. The related part output unit displays the sentences acquired by the related part extraction unit as a retrieval result to the user. Thus, the document retrieval device of the invention extracts the related parts of documents that meet the retrieval intention of the user.

16 Claims, 13 Drawing Sheets

WORD INDEX (KEYWORD VS. LIST DOCUMENT ID)

| KEYWORD | LIST CORRESPONDING DOCUMENT ID |
|---|---|
| A | 3, 10, · · · |
| AA | 4, 6, · · · |
| B | 1, 5, · · · |
| BCC | 1, 3, · · · |

DOCUMENT INDEX (DOCUMENT ID VS. LIST KEYWORD)

| DOCUMENT ID | LIST KEYWORD |
|---|---|
| 1 | B, BCC, · · · |
| 2 | C, DD, · · · |
| 3 | A, BCC, · · · |
| 4 | AA, C, · · · |

DOCUMENT GROUP

DOCUMENT ID 1, 2, 3, 4

| | FOREIGN PATENT DOCUMENTS | |
|---|---|---|
| JP | A-10-207891 | 8/1998 |
| JP | A-10-334105 | 12/1998 |
| JP | A-10-340271 | 12/1998 |
| JP | A-11-45290 | 2/1999 |
| JP | A-11-126204 | 5/1999 |

OTHER PUBLICATIONS

"New to Google? Learn the Basics," Feb. 29, 2000, available at <http://web.archive.org/web/20000229140814/www.google.com/help.html>, pp. 1-7.*

* cited by examiner

FIG.7 LIST OF TITLES : EXACT MATCHING RETRIEVAL (HIT NUMBER 61)

1. ◆ ECONOMIC STRUCTURAL REFORM, ACTION PLAN OF THE SAME [JAPAN ECONOMIC TERM]
2. ◆★ SHIP NAKHODKA SINKING ACCIDENT [FORMER USSR TERM]
3. ◆★ US-NORTH KOREA NUCLEAR FRAMEWORK AGREEMENT [PEACE/DISARMAMENT TERM]
4. ◆ SUPER GARBAGE POWER GENERATION [LOCAL ADMINISTRATION TERM]
5. ◆ CONFLICT AGAINST NUCLEAR POWER GENERATION [LOCAL RESIDENT MOVEMENT TERM]
6. ◆ PHOTOVOLTAIC POWER GENERATION SYSTEM FOR HOME USE [HOUSE LIVING TERM]
7. ◆ SOLAR-CELL [ELECTRONICS TERM]
8. ◆ THERMO ELECTRIC GENERATING ELEMENT [CONTEMPORARY ENGINEERING TERM]
9. ◆ NUCLEAR POWER [SPACE DEVELOPMENT TERM]
10. ◆ (PERMANENT) INTERNATIONAL SPACE UNIVERSITY [SPACE DEVELOPMENT TERM]
11. ◆ SPACE PHOTOVOLTAIC POWER GENERATION AND MICROWAVE POWER TRANSMISSION [SPACE DEVELOPMENT TERM]
12. ◆ SPACE COLONY [SPACE DEVELOPMENT TERM]
13. ◆ POWER FROM HYDROTHERMAL VENTS [OCEAN DEVELOPMENT TERM]
14. ◆ OCEAN ENERGY [OCEAN DEVELOPMENT TERM]
15. ◆ WAVE POWER GENERATING CAISSON [OCEAN DEVELOPMENT TERM]
16. ◆ UTILIZATION OF DEEP SEA WATER [OCEAN DEVELOPMENT TERM]
17. ◆★ EARTHQUAKE IN SATUMA DISTRICT, KAGOSHIMA PREFECTURE [EARTHQUAKE/VOLCANO TERM]
18. ◆ WASTE PLASTIC [CHEMISTRY TERM]
19. ◆ NUCLEAR FUSION [PHYSICS TERM]
20. ◆◎ ANGLE OF COMMENTARY [NUCLEAR TERM]
21. ◆ NUCLEAR POWER STATION [NUCLEAR TERM]
22. ◆ MIHAMA NUCLEAR POWER REACTOR 2 ACCIDENT [NUCLEAR TERM]
23. ◆ POWER REACTOR [NUCLEAR TERM]
24. ◆ LIGHTWATER REACTOR [NUCLEAR TERM]
25. ◆ HIGH TEMPERATURE GAS COOLING REACTOR [NUCLEAR TERM]
26. ◆ BREEDER REACTOR [NUCLEAR TERM]
27. ◆ ADVANCED THERMAL CONVERTER REACTOR (ATR) [NUCLEAR TERM]

FIG.8

LIST OF RELATED KEYWORDS AND SCORES
(DESCENDING ORDER OF THE SCORES)

| | |
|---|---|
| ENERGY TERM | 544680 |
| ENERGY | 535185 |
| ENERGY | 535185 |
| POWER GENERATION FACILITIES | 500000 |
| NUCLEAR TERM | 449438 |
| ELECTRIC UTILITY | 445454 |
| POWER COMPANY | 426315 |
| NUCLEAR POWER GENERATION | 422500 |
| FUEL CELL | 357142 |
| generation | 357142 |
| GENERATION | 306250 |
| OTHER THAN SPECIALIZED OPERATORS | 300000 |
| INSIDE POWER STATION | 300000 |
| BUSINESS DELIBERATION | 300000 |
| POWER GENERATION EFFICIENCY | 300000 |
| THERMAL POWER GENERATION | 300000 |
| POWER GENERATION CAPABILITY | 300000 |
| NUCLEAR POWER STATION | 270000 |
| KANSAI ELECTRIC POWER CO., LTD. | 266666 |
| PRIVATE POWER GENERATION | 225000 |
| ELECTRIC POWER DEMAND | 225000 |
| PRIMARY COOLING | 225000 |
| ENERGY UTILIZATION | 225000 |
| FAST BREEDER | 192307 |
| YEAR 2030 | 180000 |
| PLUTONIUM | 175000 |

*FIG.9*

THE SOLAR-CELL IS A DEVICE THAT UTILIZES THE PHOTOELECTRIC EFFECT DEMONSTRATED BY A WAFER OF THE SILICON SEMICONDUCTOR AND DIRECTLY CONVERTS THE SOLAR ENERGY INTO THE ELECTRIC ENERGY. THE SOLAR-CELL GENERATES 0.4 TO 0.5 VOLT PER ONE ELEMENT, AND 25 MILLI-AMPERES/CM2 APPROXIMATELY, BUT BY USING LARGE NUMBERS OF THE ELEMENTS, IT IS WIDELY USED AS THE POWER SOURCE FOR SATELLITES OR UNMANNED LIGHTHOUSES. FURTHER, FAMILIAR ITEMS SUCH AS ELECTRONIC WATCHES, OUTDOOR WATCHES, CALCULATORS, SHAVERS, ETC., HAVE APPEARED WHICH INCORPORATE THE SOLAR-CELL. THE SOLAR-CELL CONVERTS THE SOLAR ENERGY INTO THE ELECTRIC POWER BY ABOUT 10% AT PRESENT. IN RECENT YEARS, IN RELATION TO THE POLLUTION, ENVIRONMENTAL ISSUES, AND ENERGY PROBLEMS, A FORWARD MOVEMENT HAS BEEN SEEN IN THE RESEARCH ACTIVITIES RELATING TO THE BASIC TECHNOLOGY FOR MAKING THE SOLAR-CELL PRACTICABLE. THERE HAVE BEEN VARIOUS GOOD IDEAS DEVELOPED IN THE RESEARCH REGARDING HOW LONG IT CAN BE UTILIZED, WHEN A HOUSE IS ROOFED WITH THE SOLAR-CELLS INSTEAD OF THE TILES, AND THE RESEARCH REGARDING HOW FAR A CAR CAN TRAVEL, WHEN IT IS USED FOR THE CAR. NOW, THE TERM "SOLAR-CELL" IS A WRONG LANGUAGE IN A STRICT SENSE, WHICH IS JUST AN ENERGY CONVERSION DEVICE. WHEN THE BELL TELEPHONE LABORATORIES MADE THE FIRST ANNOUNCEMENT OF THIS DEVICE, THEY USED THE LANGUAGE "BATTERY", AND THE TERM "SOLAR-CELL" HAS BECOME A COMMON NAME SINCE THEN. THE REEVALUATION OF UTILIZING THE SOLAR ENERGY HAS BEEN CALLED FOR BY THE LESSONS OF THE CHERNOBYL NUCLEAR POWER STATION ACCIDENT IN THE USSR IN 1986. THERE APPEARS A NECESSITY TO STUDY THE SOLAR-CELL FROM VARIOUS ANGLES, SUCH AS ECONOMICS POINT OF VIEW. THERE ARE SOME PROBLEMS IN CONVERTING THE SOLAR ENERGY INTO THE ELECTRIC ENERGY THROUGH THE SOLAR-CELL. SINCE THE SOLAR ENERGY IS RAREFIED ON THE EARTH, IT IS NECESSARILY CAPTURED BY A LARGE AREA. SINCE THE GENERATED POWER IS THE DIRECT CURRENT, IT HAS TO BE CONVERTED INTO THE ALTERNATE CURRENT DEPENDING ON THE HOUSEHOLD APPLIANCES USED. A DEVISE MUST BE MADE PRACTICABLE, WHEREBY THE ENERGY GENERATED DURING THE DAYTIME IS ACCUMULATED AND IS USED IN THE NIGHT, AND THERE ARE SOME OTHER PROBLEMS TO BE SOLVED. THESE ARE THE REASONS THAT MAKE THE SOLAR-CELL COSTLY ON THE WHOLE.

THE WHOLE TEXT OF THE ITEM "SOLAR-CELL"
(QUOTED FROM ENCYCLOPEDIA OF CONTEMPORARY WORDS 1998, ISSUED BY JIYU KOKUMINSHA)

FIG. 10

LIST OF THE SCORES OF EACH SENTENCE IN THE TEXT OF THE "SOLAR-CELL"

| |
|---|
| 689652 THE SOLAR-CELL IS A DEVICE THAT UTILIZES THE PHOTOELECTRIC EFFECT DEMONSTRATED BY A WAFER OF THE SILICON SEMICONDUCTOR AND DIRECTLY CONVERTS THE SOLAR ENERGY INTO THE ELECTRIC ENERGY. |
| 0 THE SOLAR-CELL GENERATES 0.4 TO 0.5 VOLT PER ONE ELEMENT, AND 25 MILLI-AMPERES/CM$^2$ APPROXIMATELY, BUT BY USING LARGE NUMBERS OF THE ELEMENTS, IT IS WIDELY USED AS THE POWER SOURCE FOR SATELLITES OR UNMANNED LIGHTHOUSES. |
| 0 FURTHER, FAMILIAR ITEMS SUCH AS ELECTRONIC WATCHES, OUTDOOR WATCHES, CALCULATORS, SHAVERS, ETC., HAVE APPEARED WHICH INCORPORATE THE SOLAR-CELL. |
| 569826 THE SOLAR-CELL CONVERTS THE SOLAR ENERGY INTO THE ELECTRIC POWER BY ABOUT 10% AT PRESENT. |
| 344826 IN RECENT YEARS, IN RELATION TO THE POLLUTION, ENVIRONMENTAL ISSUES, AND ENERGY PROBLEMS, A FORWARD MOVEMENT HAS BEEN SEEN IN THE RESEARCH ACTIVITIES RELATING TO THE BASIC TECHNOLOGY FOR MAKING THE SOLAR-CELL PRACTICABLE. |
| 0 THERE HAVE BEEN VARIOUS GOOD IDEAS DEVELOPED IN THE RESEARCH REGARDING HOW LONG IT CAN BE UTILIZED, WHEN A HOUSE IS ROOFED WITH THE SOLAR-CELLS INSTEAD OF THE TILES, AND THE RESEARCH REGARDING HOW FAR A CAR CAN TRAVEL, WHEN IT IS USED FOR THE CAR. |
| 344826 NOW, THE TERM "SOLAR-CELL" IS A WRONG LANGUAGE IN A STRICT SENSE, WHICH IS JUST AN ENERGY CONVERSION DEVICE. |
| 0 WHEN THE BELL TELEPHONE LABORATORIES MADE THE FIRST ANNOUNCEMENT OF THIS DEVICE, THEY USED THE LANGUAGE "BATTERY", AND THE TERM "SOLAR-CELL" HAS BECOME A COMMON NAME SINCE THEN. |
| 851076 THE REEVALUATION OF UTILIZING THE SOLAR ENERGY HAS BEEN CALLED FOR BY THE LESSONS OF THE CHERNOBYL NUCLEAR POWER STATION ACCIDENT IN THE USSR IN 1986. |
| 0 THERE APPEARS A NECESSITY TO STUDY THE SOLAR-CELL FROM VARIOUS ANGLES, SUCH AS ECONOMICS POINT OF VIEW. |
| 569826 THERE ARE SOME PROBLEMS IN CONVERTING THE SOLAR ENERGY INTO THE ELECTRIC ENERGY THROUGH THE SOLAR-CELL. |
| 344826 SINCE THE SOLAR ENERGY IS RAREFIED ON THE EARTH, IT IS NECESSARILY CAPTURED BY A LARGE AREA. |
| 0 SINCE THE GENERATED POWER IS THE DIRECT CURRENT, IT HAS TO BE CONVERTED INTO THE ALTERNATE CURRENT DEPENDING ON THE HOUSEHOLD APPLIANCES USED. |
| 344826 A DEVISE MUST BE MADE PRACTICABLE, WHEREBY THE ENERGY GENERATED DURING THE DAYTIME IS ACCUMULATED AND IS USED IN THE NIGHT, AND THERE ARE SOME OTHER PROBLEMS TO BE SOLVED. THESE ARE THE REASONS THAT MAKE THE SOLAR-CELL COSTLY ON THE WHOLE. |

FIG.11

◆ SOLAR-CELL [ELECTRONICS TERM]

[CONDENSED RATIO: 10%] THE SOLAR-CELL IS A DEVICE THAT UTILIZES THE PHOTOELECTRIC EFFECT DEMONSTRATED BY A WAFER OF THE SILICON SEMICONDUCTOR AND DIRECTLY CONVERTS THE SOLAR ENERGY INTO THE ELECTRIC ENERGY. THE REEVALUATION OF UTILIZING THE SOLAR ENERGY HAS BEEN CALLED FOR BY THE LESSONS OF THE USSR CHERNOBYL NUCLEAR POWER STATION ACCIDENT IN 1986.

THE RELATED PLACES OF THE ITEM "SOLAR-CELL"(QUOTED FROM ENCYCLOPEDIA OF CONTEMPORARY WORDS 1998, ISSUED BY JIYUKOKUMINSHA)

FIG.12

◆ SOLAR-CELL [ELECTRONICS TERM]

[CONDENSED RATIO: 10%] THE SOLAR-CELL IS A DEVICE THAT UTILIZES THE PHOTOELECTRIC EFFECT DEMONSTRATED BY A WAFER OF THE SILICON SEMICONDUCTOR AND DIRECTLY CONVERTS THE SOLAR ENERGY INTO THE ELECTRIC ENERGY. THE REEVALUATION OF UTILIZING THE SOLAR ENERGY HAS BEEN CALLED FOR BY THE LESSONS OF THE USSR CHERNOBYL NUCLEAR POWER STATION ACCIDENT IN 1986.

THE RELATED PLACES OF THE ITEM "SOLAR-CELL"(QUOTED FROM ENCYCLOPEDIA OF CONTEMPORARY WORDS 1998, ISSUED BY JIYUKOKUMINSHA)

FIG.13

THE SOLAR-CELL IS A DEVICE THAT UTILIZES THE PHOTOELECTRIC EFFECT DEMONSTRATED BY A WAFER OF THE SILICON SEMICONDUCTOR AND DIRECTLY CONVERTS THE SOLAR ENERGY INTO THE ELECTRIC ENERGY. THE SOLAR-CELL GENERATES 0.4 TO 0.5 VOLT PER ONE ELEMENT, AND 25 MILLI-AMPERES/CM2 APPROXIMATELY, BUT BY USING LARGE NUMBERS OF THE ELEMENTS, IT IS WIDELY USED AS THE POWER SOURCE FOR SATELLITES OR UNMANNED LIGHTHOUSES. FURTHER, FAMILIAR ITEMS SUCH AS ELECTRONIC WATCHES, OUTDOOR WATCHES, CALCULATORS, SHAVERS, ETC., HAVE APPEARED WHICH INCORPORATE THE SOLAR-CELL. THE SOLAR-CELL CONVERTS THE SOLAR ENERGY INTO THE ELECTRIC POWER BY ABOUT 10% AT PRESENT. IN RECENT YEARS, IN RELATION TO THE POLLUTION, ENVIRONMENTAL ISSUES, AND ENERGY PROBLEMS, A FORWARD MOVEMENT HAS BEEN SEEN IN THE RESEARCH ACTIVITIES RELATING TO THE BASIC TECHNOLOGY FOR MAKING THE SOLAR-CELL PRACTICABLE. THERE HAVE BEEN VARIOUS GOOD IDEAS DEVELOPED IN THE RESEARCH REGARDING HOW LONG IT CAN BE UTILIZED, WHEN A HOUSE IS ROOFED WITH THE SOLAR-CELLS INSTEAD OF THE TILES, AND THE RESEARCH REGARDING HOW FAR A CAR CAN TRAVEL, WHEN IT IS USED FOR THE CAR. NOW, THE TERM "SOLAR-CELL" IS A WRONG LANGUAGE IN A STRICT SENSE, WHICH IS JUST AN ENERGY CONVERSION DEVICE. WHEN THE BELL TELEPHONE LABORATORIES MADE THE FIRST ANNOUNCEMENT OF THIS DEVICE, THEY USED THE LANGUAGE "BATTERY", AND THE TERM "SOLAR-CELL" HAS BECOME A COMMON NAME SINCE THEN. THE REEVALUATION OF UTILIZING THE SOLAR ENERGY HAS BEEN CALLED FOR BY THE LESSONS OF THE CHERNOBYL NUCLEAR POWER STATION ACCIDENT IN THE USSR IN 1986. THERE APPEARS A NECESSITY TO STUDY THE SOLAR-CELL FROM VARIOUS ANGLES, SUCH AS ECONOMICS POINT OF VIEW. THERE ARE SOME PROBLEMS IN CONVERTING THE SOLAR ENERGY INTO THE ELECTRIC ENERGY THROUGH THE SOLAR-CELL. SINCE THE SOLAR ENERGY IS RAREFIED ON THE EARTH, IT IS NECESSARILY CAPTURED BY A LARGE AREA. SINCE THE GENERATED POWER IS THE DIRECT CURRENT, IT HAS TO BE CONVERTED INTO THE ALTERNATE CURRENT DEPENDING ON THE HOUSEHOLD APPLIANCES USED. A DEVISE MUST BE MADE PRACTICABLE, WHEREBY THE ENERGY GENERATED DURING THE DAYTIME IS ACCUMULATED AND IS USED IN THE NIGHT, AND THERE ARE SOME OTHER PROBLEMS TO BE SOLVED. THESE ARE THE REASONS THAT MAKE THE SOLAR-CELL COSTLY ON THE WHOLE.

THE WHOLE TEXT OF THE ITEM "SOLAR-CELL"
(QUOTED FROM ENCYCLOPEDIA OF CONTEMPORARY WORDS 1998, ISSUED BY JIYU KOKUMINSHA)

DEVICE AND METHOD FOR RETRIEVING DOCUMENTS

BACKGROUND OF THE INVENTION

1. Field of the Invention

The present invention relates to a document retrieval technique, specifically to a document retrieval technique that outputs the parts of a document related to a retrieval condition from the contents of a retrieved document.

2. Description of the Related Art

A conventional document retrieval system that uses bibliographical items and keywords, etc., as a retrieval condition displays the number of retrieved documents, a list of retrieved titles and the like as a retrieved result. To determine whether or not the retrieved result is appropriate to the retrieval intention, it has been necessary that the user reads and judges each of all the sentences of the retrieved document. However, the retrieval intention of the user is not necessarily appropriately expressed in all the sentences of the document. When many documents are retrieved, or when the sentences of the documents are long, it takes a considerable time for the user to read through all these sentences.

In recent years, mass storage media such as a CD-ROM, or networks such as a LAN or the Internet have brought mass electronic documents in distribution. Accompanied with this trend, the document retrieval system has become popular which aims at retrieving the mass electronic documents. However, a use of such a document retrieval system will frequently lead to a retrieval of great many documents, which is likely to impose an excessive load on the user to determine whether the retrieved result is appropriate.

Accordingly, a method is conceived which outputs only a part of all the sentences of the retrieved document to thereby lessen the load of judging such appropriateness.

There have been proposed various methods that automatically prepare a summary of a text. One of them is such that, assuming the nouns that frequently appear in the text to be the key words, on the basis of the frequencies of appearance of the words in the text, the significance is given to the words, based on the significance of the words thus obtained, the significance is given to the sentences, and the text is summarized by combining these sentences of significance. Another method is that the locations of important parts in a text or in a paragraph are predicted in advance from the structure of the text, and the important sentences are extracted.

In these methods, the same text always prepares the same summary. However, it is preferable to a user to prepare a different summary even from the same text in response to a different retrieval, as the retrieval intention of the user is reflected.

On the other hand, there is a method that prepares a summary by extracting the neighborhoods of a document as a retrieved result that includes the keywords as a retrieval condition. This method is called the KWIC (Keyword in Context), which is widely used, for example, in the display of the Web retrieval implement, etc. However, when the number of the keywords included in the retrieval condition is insufficient, when the parts where the keywords appear are limited, or when the keywords do not properly express the retrieval intention, the retrieval intention of the user is not necessarily presented only in the neighborhoods of the keywords. On the contrary, when the keywords appear in many parts, it becomes difficult to determine which one of these parts is more significant.

The "Device and method for summarizing a document" of the Japanese Published Unexamined Patent Application No. Hei 10-207891 discloses a method for summarizing a document using information significant in the document and information that a user wishes to acquire. This method stores in advance the documents in which the user was interested, the keywords that the user considered to be important and the like, and intends to prepare a summary that reflects the user's interest, from the retrieval condition that the user inputted and the information on the user's interest that has been stored in advance. However, this method requires each user to beforehand input information regarding the interest of each user, and to properly update the information, which is a time-consuming job.

As mentioned above, in the conventional technique for automatically summarizing a text, which determines the significance of a sentence only from the contents of the text, the retrieval intention of a user is disregarded.

In the KWIC, the retrieval intention of a user is not necessarily presented only in the neighborhoods of the keywords, and on the contrary where the keywords appear in many parts in the text, it becomes difficult to judge which one of the parts is more significant.

And, as the "Device and method for summarizing a document" of the Japanese Published Unexamined Patent Application No. Hei 10-207891, in the method for summarizing a document that beforehand inputs information regarding the interest of a user, while the interest of the user is reflected by that in the summary, this method cannot dispense with a time-consuming job that each user inputs in advance information to be acquired.

SUMMARY OF THE INVENTION

The present invention has been made in view of the foregoing circumstances, and provides a document retrieval device capable of extracting and displaying the parts related to the retrieval condition, without requiring a time-consuming job that each user inputs the information of interest in advance.

In order to solve the foregoing problem, the invention takes on the construction as set forth in the appended claims thereof.

According to one aspect of the invention, the document retrieval device that retrieves a document matching a retrieval condition inputted thereto includes: a document information storage unit for storing plural documents each in association with keywords each extracted from the documents; a retrieval condition acquisition unit for receiving the retrieval condition; matching document retrieval unit for retrieving matching documents matching the retrieval condition received by the retrieval condition acquisition unit, out of the documents stored in the document information storage unit; a related keyword calculation unit for acquiring, as related keywords, the keywords stored in the document information storage unit in correspondence with the matching documents retrieved by the matching document retrieval unit, and calculating, with regard to each of the related keywords, degrees of relatedness between the retrieval condition received by the retrieval condition acquisition unit and the related keywords, on the basis of a expression with variables, one of which is a number of the documents containing the related keywords among the matching documents, another is a number of the documents containing the related keywords among the documents stored in the document information storage unit; a related part extraction unit for extracting related parts from contents of the matching documents, on the basis of the related keywords and the degrees of relatedness which are acquired by the related keyword calculation unit; and a related part output unit for outputting the related parts acquired by the related part extraction unit.

In this configuration, as to each of the words handled as the keywords of either the related keywords or the matching documents (the documents hit by the retrieval condition), the document retrieval device acquires the degrees of relatedness with the retrieval condition on the basis of a rate at which the keywords appear in the matching documents and a rate at which the keywords appear in all the documents, and extracts the document parts including the keywords having higher degrees of relatedness. Thus, the document retrieval device is able to extract the document parts that meet the retrieval intention of a user.

Here, the document is a single unit of retrieval, which can be made up with one sentence or plural sentences.

Also in this construction, the document retrieval device may further include a related document retrieval for retrieving related documents related to the retrieval condition received by the retrieval condition acquisition unit, out of the documents stored in the document information storage unit, on the basis of the related keywords and the degrees of relatedness which are acquired by the related keyword calculation unit, wherein the related part extraction unit extracts the related parts from the contents of the related documents acquired by the related document retrieval unit, on the basis of the related keywords and the degrees of relatedness which are acquired by the related keyword calculation unit.

With regard to the retrieval condition, there are documents that meet the retrieval intention, but do not hit the retrieval condition due to the assignment of the keywords. The use of the related keywords and the degrees of relatedness will extract more documents that meet the retrieval intention.

According to another aspect of the invention, the document retrieval device that retrieves a document related to a retrieval condition inputted thereto includes: a document information storage unit for storing plural documents each in association with keywords each extracted from the documents; a retrieval condition acquisition unit for receiving the retrieval condition; a related keyword calculation unit for specifying related keywords of which degrees of relatedness are to be judged among the keywords stored in the document information storage unit, and calculating degrees of relatedness between the retrieval condition received by the retrieval condition acquisition unit and the related keywords, on the basis of a expression that assumes as a variable a number of the documents containing the related keywords among the documents stored in the document information storage unit; a related document retrieval unit for retrieving related documents related to the retrieval condition received by the retrieval condition acquisition unit, out of the documents stored in the document information storage unit, on the basis of the related keywords and the degrees of relatedness which are acquired by the related keyword calculation unit; a related part extraction unit for extracting related parts from contents of the related documents acquired by the related document retrieval unit, on the basis of the related keywords and the degrees of relatedness which are acquired by the related keyword calculation unit; and a related part output unit for outputting the related parts acquired by the related part extraction unit.

Also in this configuration, the documents can be extracted on the basis of the related keywords and the degrees of relatedness. The degree of relatedness is based on the rate at which the related keyword appears in all the documents. If the rate is low, for instance, the quantity of information will be increased, and a higher degree of relatedness will be given accordingly. Naturally, the degrees of relatedness may be calculated with the appearance rate in the related documents taken into consideration.

The related keywords can be specified in an example, as follows. That is, the construction may be made such that the retrieval condition acquisition unit receives one or plural documents stored in the document information storage unit as an input, and the related keyword calculation unit takes on, as the related keywords, words contained in the documents received by the retrieval condition acquisition unit, and calculates the degrees of relatedness between the retrieval condition received by the retrieval condition acquisition unit and the related keywords, on the basis of a expression with variables, one of which is a number of the documents containing the related keywords among the documents, another of which is a number of the documents containing the related keywords among the documents stored in the document information storage unit.

Further, the construction may be made such that the retrieval condition acquisition unit receives a sentence as an input, and the related keyword calculation unit takes on, as the related keywords, words contained in the sentence received by the retrieval condition acquisition unit among the keywords stored in the document information storage unit.

Also, other various methods can specify the related keywords. The words related to the input keywords from the thesaurus may be served as the related keywords.

Further, the configuration may include a document output unit for outputting the related documents retrieved by the related document retrieval unit in association with the related parts outputted by the related part output unit; and the related part output unit and the document output unit may change an output mode of the related keywords acquired by the related keyword calculation unit, contained in their outputs, in accordance with the degrees of relatedness of the related keywords.

Further, according to another aspect of the invention, the document retrieval device includes: a document information storage unit for storing plural documents each in association with keywords each extracted from the documents; a retrieval condition acquisition unit for receiving a retrieval condition; a matching document retrieval unit for retrieving matching documents matching the retrieval condition received by the retrieval condition acquisition unit, out of the documents stored in the document information storage unit; a related keyword calculation unit for acquiring, as related keywords, the keywords stored in the document information storage unit in correspondence with the matching documents retrieved by the matching document retrieval unit, calculating, with regard to each of the related keywords, degrees of relatedness between the retrieval condition received by the retrieval condition acquisition unit and the keywords, on the basis of a expression with variables, one of which is a number of the documents containing the keywords among the matching documents, another of which is a number of the documents containing the keywords among the documents stored in the document information storage unit, and acquiring the related keywords and the degrees of relatedness; and a related document retrieval unit for retrieving related documents related to the retrieval condition, out of the documents stored in the document information storage unit, on the basis of the related keywords and the degrees of relatedness which are acquired by the related keyword calculation unit.

In this configuration, if not matching the retrieval condition, the word having a higher degree of relatedness can be retrieved.

Further, according to another aspect of the invention, the document processing device includes: a unit for allocating scores to each of plural sentences constituting an input document, in accordance with a specific evaluation criterion; a unit for sequentially extracting the sentences on the basis of the scores; a unit for terminating the extraction of the sentences, when an accumulated quantity of the extracted sentences exceeds a specific quantity criterion; and a unit for outputting the extracted sentences in a form of an output document.

In this configuration, desired document parts can be extracted in accordance with a specific quantity criterion.

In this configuration, the quantity criterion may be set to a fixed rate to a quantity of the input document. The extraction terminating unit may be designed to extract up to a sentence at the moment of exceeding the quantity criterion, and to contain it in the output document. The sentences of the output document may be arranged in an appearance order of the sentences in the input document. The sentences of the output document may be arranged on the basis of the scores by the evaluation criterion. And, the extraction terminating unit may be designed to extract up to a character immediately before exceeding the quantity criterion, and to contain it in the output document.

Furthermore, this invention can be implemented as the invention of a method, and at least a part of it can be implemented as a computer program product (recording medium).

BRIEF DESCRIPTION OF THE DRAWINGS

Preferred embodiments of the present invention will be described in detail based on the followings, wherein:

FIG. 7 is a chart that illustrates a list of documents hit by the retrieval;

FIG. 8 is a chart that illustrates a list of scores of related keywords;

FIG. 9 is a chart that illustrates the whole text of one document "太陽電池(solar battery)" hit by the retrieval;

FIG. 10 is a chart that illustrates the scores of each sentence of the one document "太陽電池(solar battery)" hit by the retrieval;

FIG. 11 is a chart that illustrates an example of a related part outputted;

FIG. 12 is a chart that illustrates a display mode of the related part; and

FIG. 13 is a chart that illustrates a display mode of the whole text of the document.

DESCRIPTION OF THE PREFERRED EMBODIMENTS

The preferred embodiments of the invention will now be described. The following embodiments assume a document described in Japanese as a document of a retrieval object. However, the embodiments can be applied to various documents described in other languages which the morphemic analysis can be applied to such as English and Chinese.

First Embodiment

The first embodiment of the invention will be described. This embodiment retrieves the documents that meets an inputted retrieval condition, and extracts the related parts of each of the documents.

Figure 1:
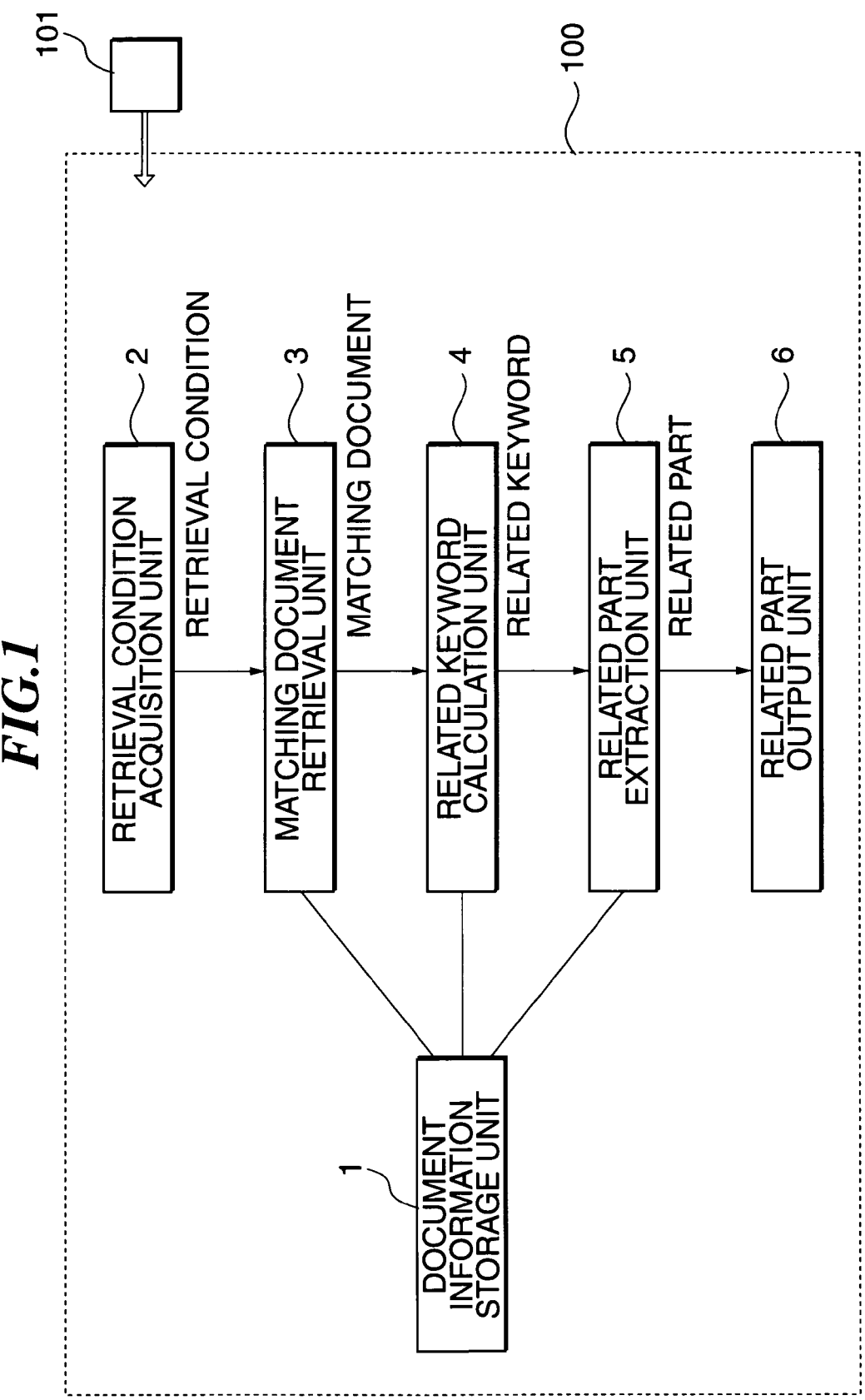
FIG. 1 is a block diagram that illustrates the construction of the first embodiment of the invention.

FIG. 1 illustrates a total construction of the document retrieval device of the first embodiment. In the drawing, the document retrieval device includes a document information storage unit 1, retrieval condition acquisition unit 2, matching document retrieval unit 3, related keyword calculation unit 4, related part extraction unit 5, and related part output unit 6. The document retrieval device of this embodiment is implemented by software that is executed on a computer system 100 (illustrated by a dotted line). This software is installed in the computer system through a recording medium 101 or the like.

Figure 5:
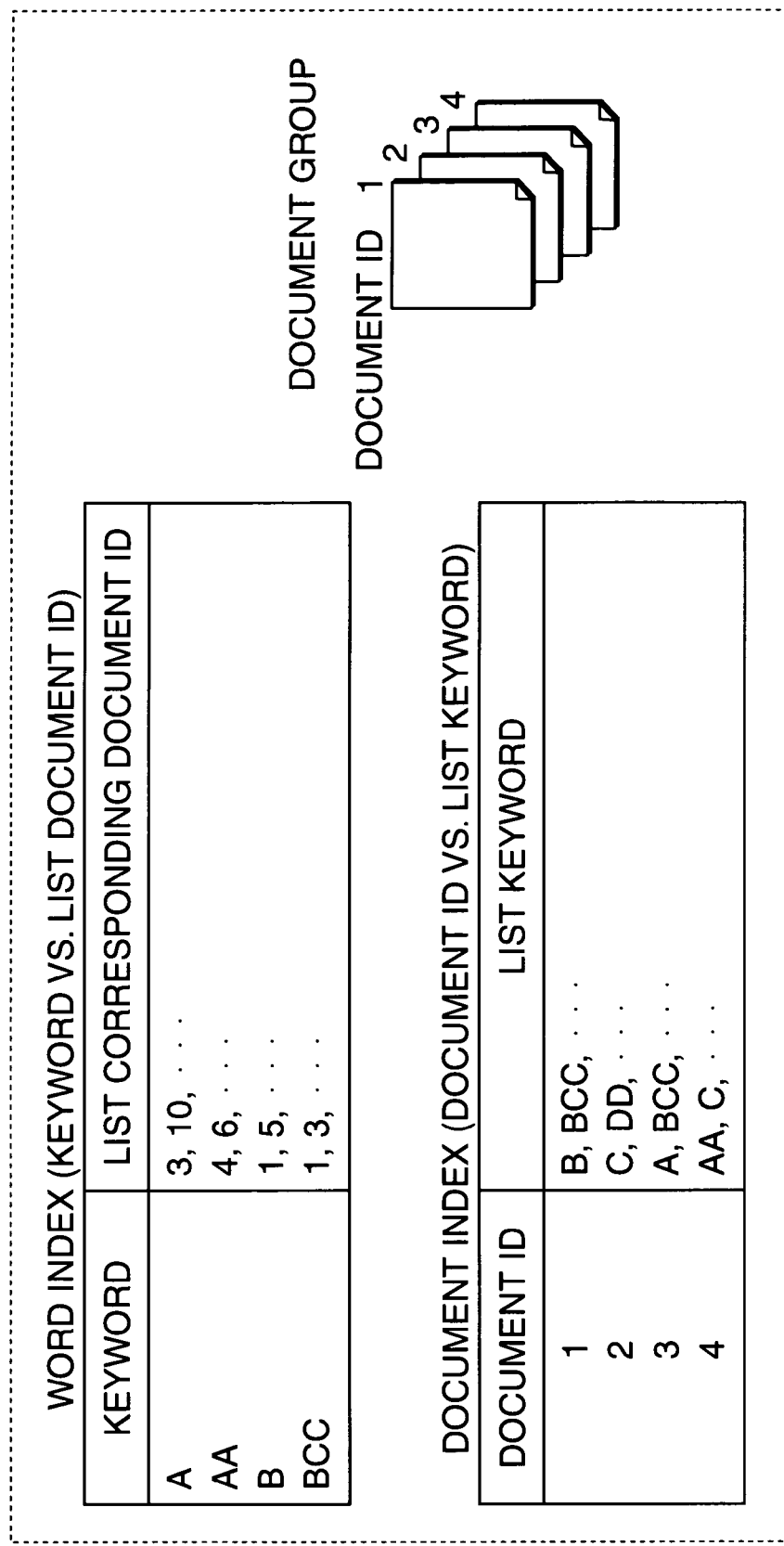
FIG. 5 is a chart that illustrates a document information storage unit 1 of the first embodiment of the invention.
Figure 6:
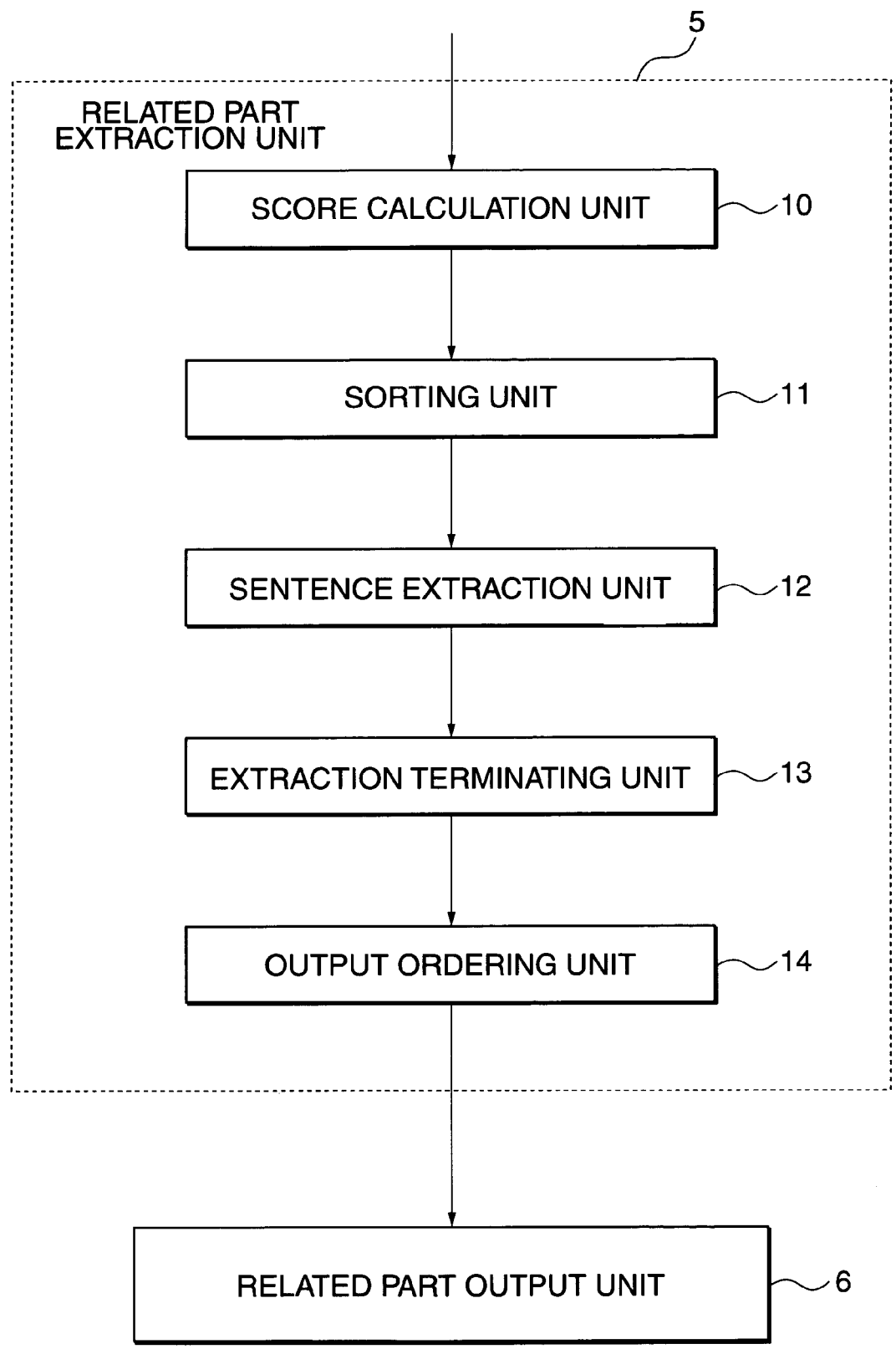
FIG. 6 is a block diagram that illustrates the construction of a related part extraction unit 5 of the first embodiment of the invention.

The document information storage unit 1 stores, as shown in FIG. 5, tables such as a word index table and a document index, and a document group. Here, the document of a retrieval object is a retrieval object unit including one or plural sentences, which is managed as one processing unit. The sentence even includes what has one word.

The document of a retrieval object is given a document ID, and in the document information storage unit 1 is stored a document file in correspondence with the document ID. Further, a list of keywords extracted from the documents (word index), and a list of document IDs of the documents that includes the keywords in correspondence with the keywords (document index) are also stored therein. The keyword is a word of the principal part, such as the noun or the verb, which is obtained by a morphemic analysis of a document as a retrieval object.

The retrieval condition acquisition unit 2 receives a logical operation expression of keywords, in which the keywords given by a user as a retrieval condition are combined with the logical operators of AND, OR, NOT, etc.

The matching document retrieval unit 3 acquires a list of the document IDs corresponding to the keywords inputted by the retrieval condition acquisition unit 2, from the word index of the document information storage unit 1, and applies a specified logical operation to the result to acquire the document IDs of the documents that match the retrieval condition. This document will hereafter be called a matching document.

The related keyword calculation unit 4 acquires the keywords extracted from the matching documents retrieved by the matching document retrieval unit 3 as the related keywords, and calculates the degrees of relatedness of each of the matching documents. That is, the related keyword calculation unit 4 looks up, with regard to each of the matching documents, the table of the document index of the document information storage unit 1, extracts each of the keywords, and assumes them as the related keywords. The degree of relatedness of the related keywords is calculated on the basis of the expression $Rw(\alpha, \beta)$ that assumes as the variables the number a of the documents including at least one of the related keywords among the matching documents and the number $\beta$ of the documents including at least one of the related keywords among all the documents stored in the document information storage unit 1. And, the expression $Rw(\alpha, \beta)$ is expressed by a fraction that takes on the square of the number $\alpha$ of the former documents as the numerator and the number $\beta$ of the latter documents as the denominator. That is, the degree of relatedness $Rw(\alpha, \beta)$ of the related keywords is expressed by the following expression.

$$Rw(\alpha,\beta)=\alpha^2/\beta \qquad \text{[Expression 1]}$$

The related part extraction unit 5 calculates the degrees of relatedness between the matching documents each and the retrieval condition, on the basis of the related keywords and the degrees of the relatedness which are acquired by the related keyword calculation unit 4, and extracts the sentences with the appearance orders in the document kept, in the descending order of the degrees of relatedness, until the total length of the sentences extracted becomes longer than a predetermined length. The degree of relatedness of a sentence is given by the sum of the degrees of relatedness of the related keywords contained in the sentence. And, the minimum length of a sentence extracted is a fixed value expressed by a ratio to the quantity of the text of the original matching documents. This value will hereafter be called the condensed ratio. In this embodiment, the sentences are extracted until the sum of the lengths of the extracted sentences exceeds a length corresponding to the condensed ratio. Naturally, the total length of the extracted sentences may be controlled not to exceed the length corresponding to the condensed ratio. In this case, the condensed ratio is set to 10%.

The related part extraction unit 5 includes a score calculation unit 10, sorting unit 11, sentence extraction unit 12, extraction truncation unit 13, and output ordering unit 14. The score calculation unit 10 accumulates the degrees of relatedness of the related keywords by the sentences each to calculate a score. The sorting unit 11 sorts the sentences in the order of the scores. The sentence extraction unit 12 extracts the sentences in the descending order of the scores. The extraction truncation unit 13 terminates to extract the sentences, when there is not a sentence of the score that exceeds the threshold. And, when the quantity of the extracted sentences exceeds a specified quantity, the extraction truncation unit 13 extracts the sentence at that moment, and then terminates to extract the sentences thereafter. The output ordering unit 14 arranges the sentences based on the list order (ID order of the sentences) in the original text of the extracted sentences. The sentences are outputted in this list order by the related part output unit 6.

The related part output unit 6 displays to the user the sentences acquired by the related part extraction unit 5 as a retrieval result.

A concrete example of retrieval will be described. Here, it is supposed that the items of the glossary (Encyclopedia of Contemporary Words 1998, issued by Jiyu Kokuminsha, corp.) are regarded as the objects of retrieval, and the topics on the power generation are retrieved.

As a retrieval condition, the items including the keyword "発電(power generation)" in the descriptive text were retrieved. The hit number of the exact matching retrieval was 61, as shown in FIG. 7.

And, then the related parts (summary) of the item (document) of "太陽電池(solar-cell)" listed on the seventh in FIG. 7 are considered to be extracted and displayed. The related keywords and the degrees of relatedness (score) regarding the "太陽電池(solar-cell)" were found as shown in FIG. 8.

Then, the whole sentence included in the item "太陽電池(solar-cell)" shown in FIG. 9 is divided into individual sentences, and the scores of the individual sentences are each calculated, as shown in FIG. 10. That is, the related keywords are extracted by the sentences each, and the degrees of relatedness are accumulated to make the score of the object sentence. In the example of FIG. 10, the first sentence scores "689652", and the sentences thereafter score "0", "0", "569826", "344826" . . . .

Next, the sentences are extracted in the descending order of the degrees of relatedness. In this case, when the ninth sentence and first sentence are extracted, the condensed ratio exceeds 10%, and the extraction is terminated. Then, the extracted sentences are arranged in the order that they appear in the original text. The outputted result is as shown in FIG. 11.

In the summary shown in FIG. 11, the keywords such as "エネルギー(energy)" and "エネルギー利用(energy utilization)" (shown by the arrows on the chart, for explanation) are found to have the higher degree of relatedness.

The keyword "発電(power generation)" given as the retrieval condition is included in the whole sentence shown in FIG. 9, but it is found to be not included in the outputted summary (FIG. 11). In the whole sentence of the item "太陽電池(solar-cell)", the word "power generation" is used in a sentence that explains the power obtained from the solar-cell to be the direct current, but it is not used in the explanation of the operation of the solar-cell. In the explanation of the operation, the word "エネルギーの変換(conversion of energy)" is used as an alternative.

When the retrieval intention is to widely know the method that generates a power, instead of strictly limiting to a device that generates a power, the related parts outputted here include the parts that meet the retrieval intention. This is the effect that can never be achieved, when the sentences including a word included in the retrieval condition are extracted.

Further, as the expression of the degree of relatedness, the following expressions can be applied as an example, in addition to the above expression.

$$Rw(\alpha,\beta)=\alpha/\beta$$

$$Rw(\alpha,\beta)=\alpha^2/\log_2(\beta) \qquad \text{[Expression 2]}$$

Here, $\alpha$ and $\beta$ are arguments. In short, the other expressions that stipulate the correlation between a related document and a related keyword can be applied.

Further, the sentences may be arranged in the descending order of the degrees of relatedness to make a summary.

Second Embodiment

Figure 2:
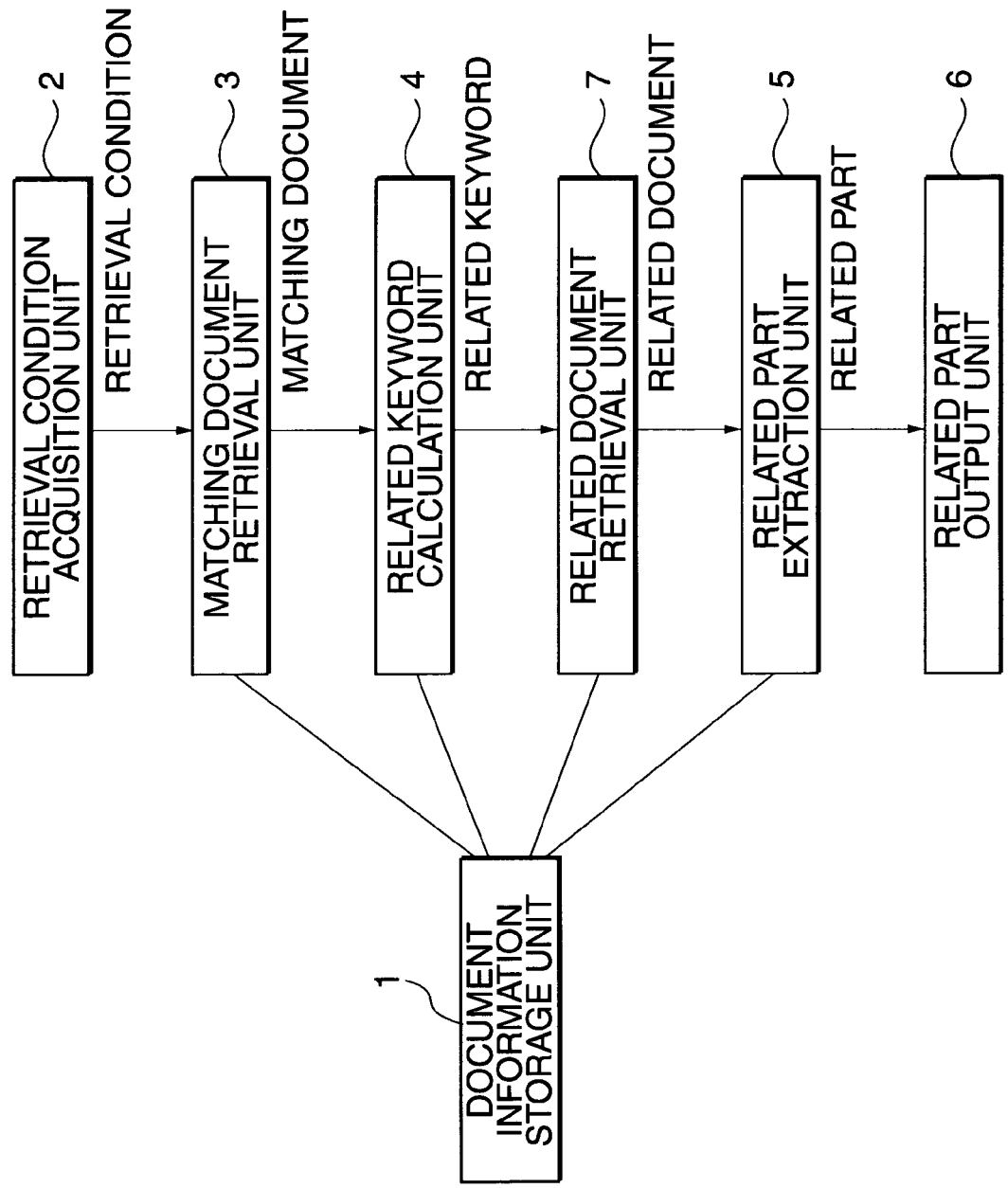
FIG. 2 is a block diagram that illustrates the construction of the second embodiment of the invention.

The second embodiment will be described. The second embodiment retrieves documents based on the degrees of relatedness of the first embodiment already explained, and further extracts the summary of the retrieved documents based also on the degrees of relatedness. FIG. 2 illustrates the total construction of the second embodiment, and in this drawing the corresponding units with those in FIG. 1 are given the corresponding symbols to omit the detailed explanations.

In FIG. 2, a document information storage unit 1, retrieval condition acquisition unit 2, matching document retrieval unit 3, and related keyword calculation unit 4 are the same as those of the first embodiment in FIG. 1.

A related document retrieval unit 7 retrieves the related documents from the document information storage unit 1, on the basis of the related keywords and the degrees of relatedness which are obtained by the related keyword calculation unit 4. The related document is a document that includes at least one related keyword. In order to acquire the degrees of relatedness of the related documents, the sum of the degrees of relatedness of the related keywords contained in the documents is calculated. And, the related documents are ranked in accordance with the degrees of relatedness. The related documents having the degrees higher than a specific degree of relatedness are retrieved in the descending order of the degrees of relatedness, from a document having the highest degree of relatedness, within a specific number of documents.

The related part extraction unit 5 is the same as in the first embodiment, except that it extracts sentences from the related documents instead of the matching documents. The related part output unit 6 is the same as in the first embodiment.

In this embodiment, the retrieval is executed not only by the keywords, but with consideration of the degrees of relatedness of the keywords as well, which makes it possible to retrieve the items more relevant to the intention of retrieval. And, the summary that meets the intention of retrieval can be extracted from all the sentences of these items.

Third Embodiment

Figure 3:
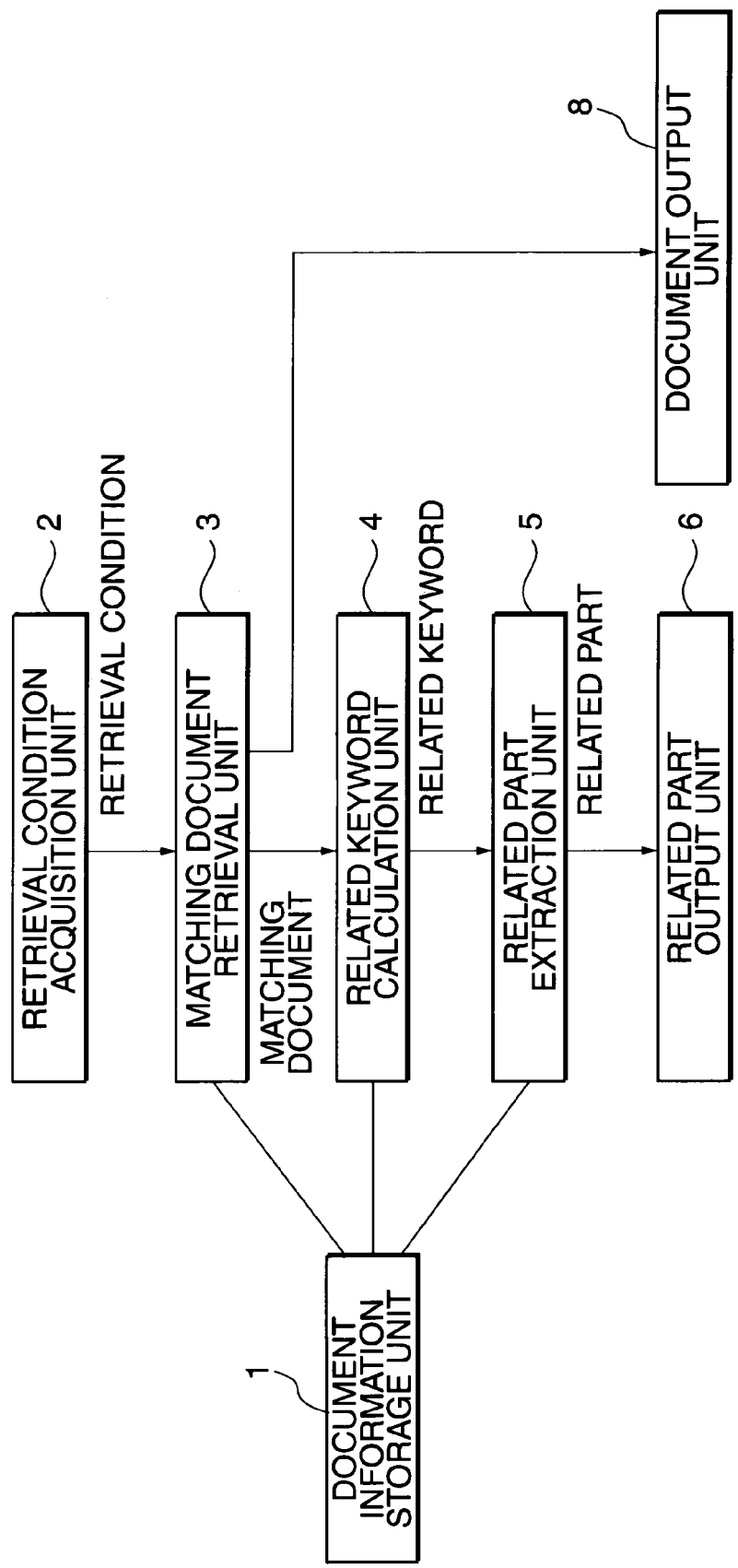
FIG. 3 is a block diagram that illustrates the construction of the first embodiment of the invention, which is based on the claim 3 of the invention.

The third embodiment will be described. The third embodiment not only outputs the summary of the hit items in the first embodiment already explained, but displays all the sentences as well. FIG. 3 illustrates the total construction of the third embodiment, and in this drawing the corresponding units with those in FIG. 1 are given the corresponding symbols to omit the detailed explanations.

In FIG. 3, a document information storage unit 1, retrieval condition acquisition unit 2, matching document retrieval unit 3, related keyword calculation unit 4, and related part output unit 5 are the same as those of the first embodiment in FIG. 1.

The document output unit 8 acquires all the sentences of the matching documents corresponding to the related part output unit 5 from the document information storage unit 1 to display them, and further emphasizes the document parts corresponding to the related parts. A concrete display example is shown in FIG. 12.

Fourth Embodiment

The fourth embodiment will be described. The fourth embodiment outputs the summary and all the sentences of the hit items, in the same manner as the third embodiment. The fundamental construction is the same as the third embodiment, and the construction is not illustrated.

In this embodiment, the related part output unit 6 and the document output unit 8 emphasize, by underlining, the related keywords having the degrees of relatedness higher than a specific value, when these related keywords are included in the outputs. Concrete display examples are shown in FIG. 12 and FIG. 13.

Fifth Embodiment

Figure 4:
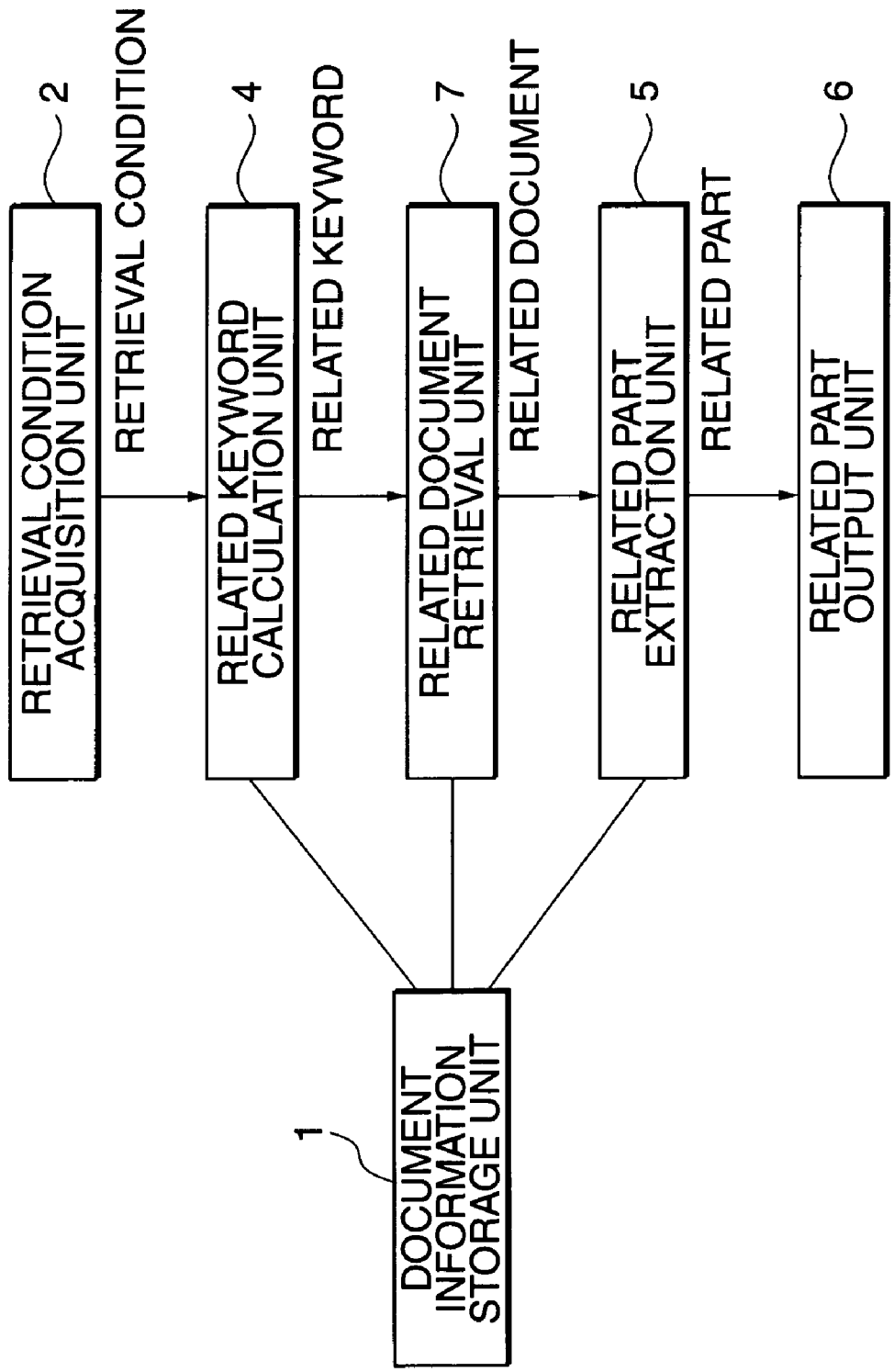
FIG. 4 is a block diagram that illustrates the construction of the first embodiment of the invention, which is based on the claim 6 of the invention.

The fifth embodiment will be described. This embodiment specifies one or plural documents stored in the document information storage unit 1, and retrieves the documents related to the one or plural documents. FIG. 4 illustrates the total construction of the fifth embodiment. In FIG. 5, the corresponding units with those in FIG. 1 and FIG. 2 are given the corresponding symbols to omit the detailed explanations.

In FIG. 5, the user designates one or plural documents stored in the document information storage unit 1. The retrieval condition acquisition unit 2 receives the one or plural document IDs designated, as the input. The document information storage unit 1 and the related part output unit 6 are the same as those in the first embodiment. The related keyword calculation unit 4 is the same as that in the first embodiment, except that it takes in the documents received by the retrieval condition acquisition unit 2 instead of the matching documents. The related document retrieval unit 7 and the related part extraction unit 5 are the same as those in the second embodiment.

In this embodiment, on the basis of the document IDs specified in the retrieval condition acquisition unit 2, the related keyword calculation unit 4 assumes the keywords included in any of the documents specified by the document IDs as the related keywords, and calculates the degrees of relatedness thereof. In this case, in the expression $Rw(\alpha, \beta)$ to calculate the degree of relatedness already explained, the variable $\alpha$ is the number of the documents including at least one of the related keywords among the one or plural documents stipulated by the document IDs inputted to the retrieval condition acquisition unit 2, and the variable $\beta$ is the number of the documents including at least one of the related keywords among all the documents stored in the document information storage unit 1.

The related document retrieval unit 7 accumulates the degrees of relatedness of the keywords contained in the documents stored in the document information storage unit 1, orders the documents in accordance with the degrees of relatedness, and outputs the documents having the degrees higher than a specific degree of relatedness, from a document having the highest degree of relatedness, within a specific number of documents.

This embodiment makes it possible to designate a document and retrieve documents related to the document designated. Further, this embodiment makes it possible to designate one or plural documents out of the documents acquired by the retrieval in the first embodiment or the second embodiment, and to retrieve the related documents thereof. Naturally, the retrieval can be executed on the basis of the related documents acquired by the retrieval in this embodiment. Thus, based on the retrieval result executed previously, the retrieval can be executed repeatedly. Here, if it is made to designate only the desired one from the retrieval result, the retrieval will be optimized.

Sixth Embodiment

The sixth embodiment will be described. This embodiment inputs natural language sentences, in contrast to the fifth embodiment that specifies the documents stored in the document information storage unit 1 to retrieve the related documents, and retrieves the documents related to the natural language sentences.

The fundamental configuration is the same as the fifth embodiment, which is not illustrated.

In this embodiment, the retrieval condition acquisition unit 2 receives the natural language sentences that express retrieval requests. The retrieval condition acquisition unit 2 applies the morphemic analysis to the natural language sentences to extract the keywords. The natural language sentence may include one sentence or plural sentences. Or, it may be uncompleted. A normal parser can be used to extract this. The related keyword calculation unit 4 calculates the degrees of relatedness of the keywords extracted, and selects the documents on the basis of the degrees of relatedness of these keywords as the related documents.

The related document extraction unit 5 extracts the summaries on the basis of the degrees of relatedness of the keywords, with regard to each of the related documents selected.

This embodiment performs the retrieval using the natural language sentences. In addition, since the natural language sentences can be considered to appropriately express the retrieval intention of the user, it allows the user to retrieve the documents that meet the intention of retrieval.

Further, instead of generating the related keywords from the natural language sentences, it may be designed to generate the related keywords by using the words from the thesaurus.

According to the invention thus described, the following effects can be implemented:

(1) the document parts related to the retrieval condition are outputted from the contents of the documents retrieved, (2) since the related parts to be outputted are obtained not only from the keywords explicitly designated as the retrieval condition but also from the related keywords related to the retrieval condition, the document parts relevant to the contents of the retrieval intention are outputted even from other parts than the neighborhoods of the designated keywords, (3) since the related parts are extracted on the basis of the related keywords having the degrees of relatedness, a specific quantity of texts is always outputted among the related parts, and (4) the information regarding the interest of a user is not needed to be prepared individually by the user.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A document retrieval device that retrieves a document matching a retrieval condition inputted thereto, comprising:
    document information storage means for storing, in a table, plural documents each in association with words extracted from the document, the document having a document ID identifying a storage location in the storage means of a document file;
    retrieval condition acquisition means for receiving the retrieval condition that includes at least a word given by a user as a retrieval condition in combination with a logical operator;
    matching document retrieval means for retrieving plural documents matching the retrieval condition received by the retrieval condition acquisition means, out of the documents stored in the document information storage means and applying a specified logical operation to the result to acquire the document ID of the documents that match the retrieval condition;
    related word calculation means for acquiring, as related words, the words stored in the document information storage means that are associated with plural matching documents retrieved by the matching document retrieval means, and calculating, with regard to each of the related words, a degree of relatedness among the matching documents, based on an expression with variables that includes a number of the documents containing the related word among the matching documents and a number of the documents containing the related word among the documents stored in the document information storage means;
    related part extraction means for extracting a plurality of related parts from contents of the document, on the basis of the related word and the degree of relatedness which are acquired by the related word calculation means; and
    related part output means for outputting the related parts acquired by the related part extraction means and displaying them in order of appearance in the documents along with a score representing a relative degree of relatedness.

2. A document retrieval device according to claim 1, further comprising:
    related document retrieval means for retrieving a related document related to the retrieval condition received by the retrieval condition acquisition means, out of the documents stored in the document information storage means, on the basis of the related word and the degree of relatedness which are acquired by the related word calculation means, wherein
    the related part extraction means extracts the related part from the contents of the related document acquired by the related document retrieval means, on the basis of the related word and the degree of relatedness which are acquired by the related word calculation means.

3. A document retrieval device according to claim 1, further comprising:
    document output means for outputting the related document retrieved by the related document retrieval means in association with the related part outputted by the related part output means.

4. A document retrieval device according to claim 1, wherein the related part output means and the document output means change an output mode of the related word acquired by the related word calculation means, contained in their outputs, in accordance with the degree of relatedness of the related word.

5. A document retrieval device that retrieves a document related to a retrieval condition inputted thereto, comprising:
    document information storage means for storing, in a table, plural documents each in association with words extracted from the document, the document having a document ID identifying a storage location in the storage means of a document file;
    retrieval condition acquisition means for receiving the retrieval condition that includes at least a word given by a user as a retrieval condition in combination with a logical operator;
    related word calculation means for specifying a related word whose degree of relatedness is to be judged among the words stored in the document information storage means associated with documents that match the retrieval condition, and calculating the degree of relatedness among the matching documents, based on an expression that includes a number of the documents containing the related word among matching documents and a number of the documents containing the related word among the documents stored in the document information storage means;

related document retrieval means for retrieving a document related to the retrieval condition received by the retrieval condition acquisition means, out of the documents stored in the document information storage means, on the basis of the related word and the degree of relatedness which are acquired by the related word calculations means and applying a specified logical operation to the result to acquire the document ID of the documents that match the retrieval condition;

related part extraction means for extracting a plurality of related parts from contents of the related document acquired by the related document retrieval means, on the basis of the related word and the degree of relatedness which are acquired by the related word calculation means; and related part output means for outputting the related parts acquired by the related part extraction means and displaying them in order of appearance in the documents along with a score representing a relative degree of relatedness.

6. A document retrieval device according to claim 5, wherein:

the retrieval condition acquisition means receives one or plural documents stored in the document information storage means as an input; and the related word calculation means assumes, as the related word, a word contained in the documents received by the retrieval condition acquisition means, and calculates the degree of relatedness between the retrieval condition received by the retrieval condition acquisition means and the related word, on the basis of an expression with variables, one of which is a number of the documents containing the related word among the documents, another is a number of the documents containing the related word among the documents stored in the document information storage means.

7. A document retrieval device according to claim 5, wherein:

the retrieval condition acquisition means receives a sentence as an input; and the related word calculation means assumes, as the related word, a word contained in the sentence received by the retrieval condition acquisition means among the words stored in the document information storage means.

8. A document retrieval device, comprising:

document information storage means for storing, in a table, plural documents each in association with words extracted from the document, the document having a document ID identifying a storage location in the storage means of a document file;

retrieval condition acquisition means for receiving a retrieval condition that includes at least a word given by a user as a retrieval condition in combination with a logical operator;

matching document retrieval means for retrieving plural documents matching the retrieval condition received by the retrieval condition acquisition means, out of the documents stored in the document information storage means and applying a specified logical operation to the result to acquire the document ID of the documents that match the retrieval condition;

related word calculation means for acquiring, as related words, the words stored in the document information storage means that are associated with the plural matching documents retrieved by the matching document retrieval means, calculating, with regard to each of the related words, a degree of relatedness among the matching documents, based on an expression with variables that includes, a number of the documents containing the related word among the matching documents and a number of the documents containing the related word among the documents stored in the document information storage means, and acquiring the related word and the degree of relatedness; and related part extraction means for extracting a plurality of related parts from contents of the document, wherein a related part from contents of the document are plural sentences, the device further including:

means for allocating a score to each of plural sentences constituting an input document, in accordance with a specific evaluation criterion, the score indicating a relative degree of relatedness;

means for sequentially extracting the sentences on the basis of the scores;

means for terminating the extraction of the sentences, when an accumulated quantity of the extracted sentences exceeds a specific quantity criterion; and means for outputting the extracted sentences in a form of an output document.

9. A document retrieval device according to claim 8, wherein the quantity criterion is a fixed rate to a quantity of the input document.

10. A document retrieval device according to claim 8, wherein the extraction terminating means up to a sentence at the moment when the quantity of the extracted sentences exceeds the quantity criterion, and contains the sentence in the output document.

11. A document retrieval device according to claim 8, wherein the sentences in the output document are arranged in an appearance order of the sentences in the input document.

12. A document retrieval device according to claim 8, wherein the sentences in the output document are arranged on the basis of the scores in accordance with the evaluation criterion.

13. A document retrieval device according to claim 8, wherein the extraction terminating means extracts up to a character immediately before the quantity of the extracted sentences exceeds the quantity criterion, and contains the character in the output document.

14. A document retrieval device, comprising:

document information storage means for storing, in a table, plural documents each in association with words extracted from the document, the document having a document ID identifying a storage location in the storage means of a document file;

retrieval condition acquisition means for receiving a retrieval condition that includes at least a word given by a user as a retrieval condition in combination with a logical operator;

document retrieval means for executing a retrieval of the documents stored in the document information storage means by using the retrieval condition, and applying a specified logical operation to the result to acquire the document ID of the documents that match the retrieval condition;

related word calculation means for acquiring, as related words, the words stored in the document information storage means that are associated with the matching documents of the retrieval condition, and calculating, with regard to each of the related words, a degree of relatedness among the matching documents, based on an expression that includes at least one of a number of the documents containing the related word among the matching documents and a number of the documents containing the related word among the documents stored in the document information storage means;

related part extraction means for extracting a plurality of related parts from contents of the retrieved documents, on the basis of the related word and the degree of relatedness which are acquired by the related word calculation means; and related part output means for outputting the related parts acquired by the related part extraction means and displaying them in order of appearance in the documents along with a score representing a relative degree of relatedness.

15. A document retrieval method, comprising the steps of:

storing, in a table, plural documents each in association with words extracted from the document, the document having a document ID identifying a storage location in the storage means of a document file;

receiving a retrieval condition that includes at least a word given by a user as a retrieval condition in combination with a logical operator;

executing a retrieval of the stored documents by using the retrieval condition, and applying a specified logical operation to the result to acquire the document ID of the documents that match the retrieval condition;

acquiring, as related words, the words stored in association with the matched documents of the retrieval condition, and calculating, with regard to each of the related words, a degree of relatedness among the matching documents, based on an expression that includes at least one of a number of the documents containing the related word among the matching documents and a number of the documents containing the related word among the stored documents;

extracting a plurality of related parts from contents of a retrieved document, on the basis of the related word and the degree of relatedness; and outputting the related parts extracted and displaying them in order of appearance in the documents along with a score representing a relative degree of relatedness.

16. A recording medium readable by a computer, the medium storing a program of instructions for causing the computer to execute a function, comprising:

storing, in a table, plural documents each in association with words extracted from the document, the document having a document ID identifying a storage location in the storage means of a document file;

receiving a retrieval condition that includes at least a word given by a user as a retrieval condition in combination with a logical operator;

executing a retrieval of the stored documents by using the retrieval condition, and applying a specified logical operation to the result to acquire the document ID of the documents that match the retrieval condition;

acquiring, as related words, the words stored in association with plural matched documents, and calculating, with regard to each of the related words, a degree of relatedness among the matching documents, based on an expression that includes at least one of a number of the documents containing the related word among the matching documents and a number of the documents containing the related word among the stored documents;

extracting a plurality of related parts from contents of a retrieved document, on the basis of the related word and the degree of relatedness; and outputting the related parts extracted and displaying them in order of appearance in the documents along with a score representing a relative degree of relatedness.

* * * * *